US005381989A

United States Patent [19]

Jackson

[11] Patent Number: 5,381,989

[45] Date of Patent: Jan. 17, 1995

[54] ADJUSTABLE SPRING CLAMP

[76] Inventor: Ronald E. Jackson, 216 W. Southport Rd., Indianapolis, Ind. 46217

[21] Appl. No.: 192,627

[22] Filed: Feb. 7, 1994

[51] Int. Cl.[6] ............................ F16L 3/00

[52] U.S. Cl. ............................ 248/122; 24/509; 248/316.7

[58] Field of Search ............... 248/231.8, 316.7, 316.5, 248/121, 122; 24/510, 457, 509

[56] References Cited

U.S. PATENT DOCUMENTS

| | | | |
|---|---|---|---|
| 2,102,220 | 12/1937 | Richardson | 24/510 X |
| 2,919,058 | 12/1959 | Thompson | 248/316.7 X |
| 2,981,509 | 4/1961 | Messenger | 248/316.7 X |
| 3,239,902 | 3/1966 | Cohen | 24/457 X |
| 3,559,934 | 2/1971 | Jensen | 248/316.7 X |
| 3,689,687 | 9/1972 | Bosch | 248/316.7 X |
| 4,968,078 | 11/1990 | Fitzwater | 24/509 X |
| 5,142,776 | 9/1992 | Neely | 24/509 X |

*Primary Examiner*—J. Franklin Foss
*Attorney, Agent, or Firm*—Locke Reynolds

[57] ABSTRACT

An adjustable clamp includes first and second gripping members pivotally coupled to each other for movement about a pivot pin, a helically coiled spring having a tubular portion disposed around the pivot pin having first and second end extensions extending from the tubular portion for biasing the gripping members toward a gripping position, and a bar having a threaded aperture, a threaded member, and a bracket, the bar being positioned between the helically coiled spring first end extension and the first gripping member, the bracket being coupled to the first gripping member and the threaded member rotatably engaging the bracket and the bar, the bar being movable relative to the bracket in response to rotation of the threaded member so as to reposition the first and second end extensions relative to each other thereby adjusting the force applied by the spring against the gripping members. An elastomeric member covers the end of the lever arms remote from the jaws, and an end portion of a support stand is received between one of the lever arms and the elastomeric member covering said lever arm, a support member extending downwardly from said end portion to a generally trapezoidal base member unitary with the support member further including non-skid means for reducing movement of the base member relative to a work surface.

17 Claims, 5 Drawing Sheets

ADJUSTABLE SPRING CLAMP

BACKGROUND OF THE INVENTION

The present invention relates to clamps and particularly to spring clamps having a spring for biasing the clamps toward a closed position. More particularly, the invention relates to clamps with an adjustment mechanism for adjusting the bias of the spring.

Spring clamps are well known in the art and come in a wide range of gripping strengths. For example, at one end of the spectrum, some clamps are quite large with enormous strength for holding large workpieces in various industrial manufacturing and repair applications. At the other end of the spectrum, home hobbyists use relatively weak clamps for holding small parts when assembling plastic models or the like.

Unfortunately, in many instances a particular clamp may be too strong (or weak) for a desired application. For example, an industrial strength clamp would crush the hobbyist's small plastic part, and is therefore unusable in the hobbyist application. Moreover, even in a particular situation, such as a workshop, a worker might have need for various gripping strengths, requiring separate clamps.

Maintaining an assortment of clamps for holding a variety of workpieces to cover a variety of jobs that a workman might be called upon to perform can be very costly. Thus, a single clamp that can be adjusted for use in a wide variety of applications would be very useful. A adjustable spring clamp that is economical to produce yet includes a simple and effective mechanism to adjust the amount of gripping strength would be very useful clamp and would be welcome by users.

SUMMARY OF THE INVENTION

According to the present invention, an adjustable clamp comprises first and second gripping members coupled together for pivotal movement about a pivot pin between a gripping position and a releasing position and force applying means, coupled to the pivot pin and the gripping members, for applying a closing force to the gripping members. The clamp further includes means for repositioning the force applying means to change the amount of the closing force.

The first and second gripping members include first and second jaws and first and second lever arms, respectively. The lever arms extend from the jaws, with the jaws and lever arms positioned on opposite sides of the pivot pin. The force applying means includes a spring wrapped around the pivot pin and having first and second end extensions positioned to engage the first and second lever arms, respectively.

The repositioning means includes a cylindrical bar having a threaded transverse bore, a bracket attached to the first lever arm, and a threaded member rotatably coupled to the bracket and threadedly coupled to the bar. The bar is positioned between the first end extension of the spring and the first lever arm, and the threaded member extends between the bracket and the bar, so that rotation of the threaded member moves the bar relative to the first lever arm. As the bar moves, it engages the first end extension of the spring, causing the first end extension to move relative to the second end extension. The relative movement between the first and second end extensions increases or decreases the tension in the spring, and therefore changes the force that the spring applies to the lever arms.

A support stand can be coupled to the first gripping member for holding the clamp in a predetermined orientation. The preferred support stand includes a generally trapezoidal base member having a first edge and a support member coupled to the base member at the first edge. The support member includes a generally trapezoidal lower portion and a generally rectangular upper portion extending upwardly from the lower portion. The rectangular upper portion is configured to engage the clamp. Non-skid pads for reducing movement of the base member relative to a work surface are attached to the bottom of the base member.

Additional objects, features, and advantages of the invention will become apparent to those skilled in the art upon consideration of the following detailed description of a preferred embodiment exemplifying the best mode of carrying out the invention as presently perceived.

DETAILED DESCRIPTION OF THE PREFERRED EMBODIMENT

Figure 1:
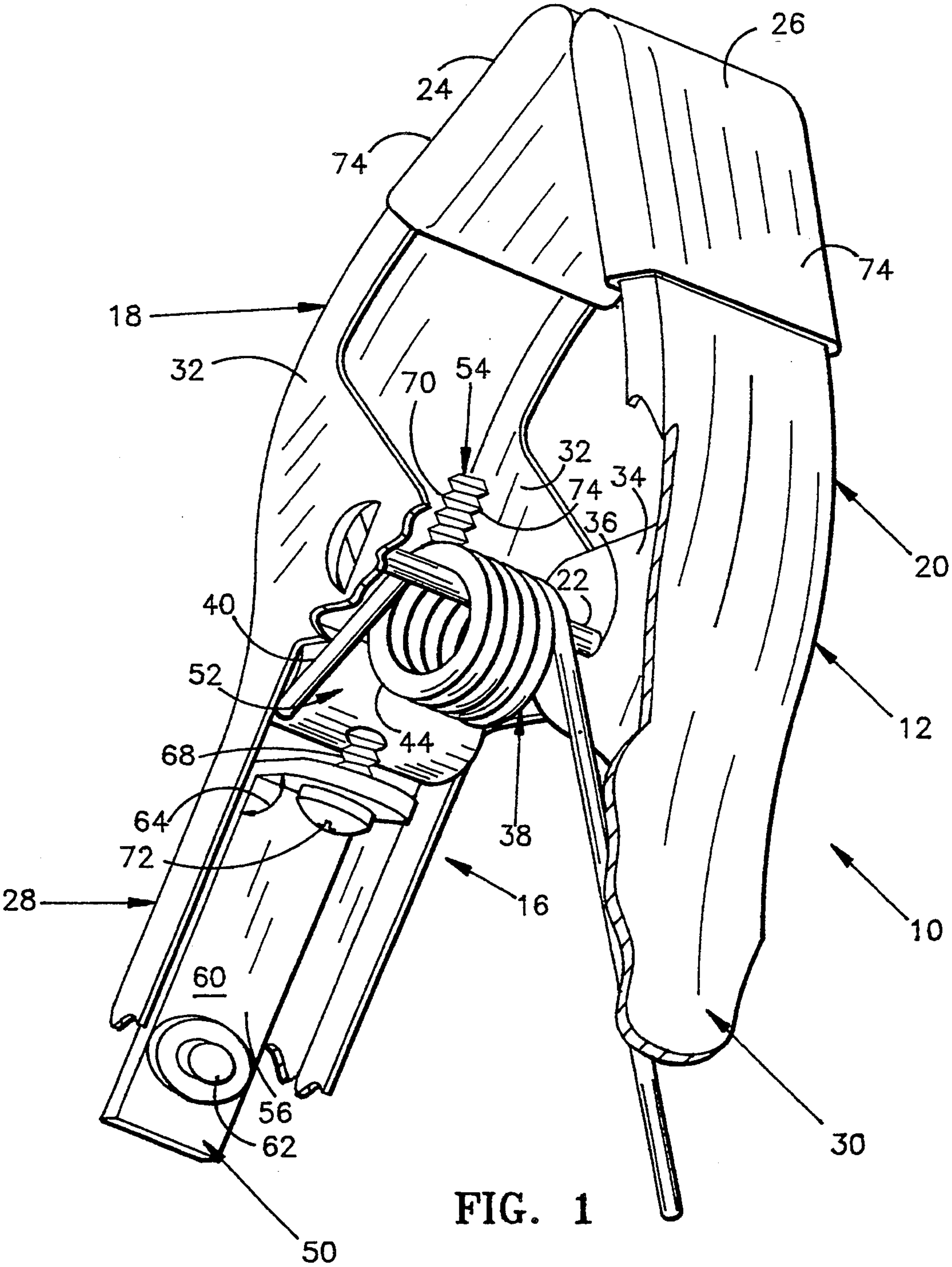
FIG. 1 is a perspective view, partially cut away, of a spring clamp incorporating the adjustment mechanism of the present invention. The adjustment mechanism includes a bracket attached to the clamp, a bar positioned to engage the biasing spring, and a threaded member rotatably coupled to the bracket and the bar to move the bar relative to the clamp.

An adjustable spring clamp 10 constructed according to the present invention is illustrated in FIGS. 1–4. The adjustable spring clamp 10 includes a conventional clamp 12 having a coil spring 14 for biasing the clamp 12 toward a gripping position shown in the drawings and an adjustment mechanism 16 for changing the tension of the spring 14 to adjust the bias of the spring 14, and therefore, the gripping strength of the clamp 12.

The conventional clamp 12 includes first and second gripping members 18 and 20 pivotally coupled to a pivot pin 22. The gripping members 18 and 20 include first and second gripping jaws 24 and 26 and first and second lever arms 28 and 30 extending from the jaws 24 and 26, respectively. Brackets 32 and 34 extend from either side of each of the lever arms 28 and 30 and include pivot pin receiving apertures 36. The brackets 32 and 34 are positioned to overlap each other and align the pivot pin receiving apertures 36.

The clamp 12 further includes a force applying means in the form of a helically coiled spring 14 includes a coiled portion 38 forming a tube 44 and first and second end extensions 40 and 42 projecting from the tube 44. The tube 44 is disposed between the brackets 32 and 34 so as to align the interior of the tube 44 with the apertures 36 in the brackets 32 and 34. The pivot pin 22 extends between the apertures 36 and through the interior of the tube 44 to hold the spring 14 in position relative to the jaws 24 and 26 and lever arms 28 and 30. The end extensions 40 and 42 project generally away from the jaws 24 and 26 and engage the lever arms 28 and 30. The tension in the spring 14 biases the lever arms 28 and 30 to move apart, thereby urging the jaws 24 and 26 toward each other and the gripping position illustrated in the figures.

The adjustment mechanism 16 for changing the tension of the spring 14 includes a bracket 50, a cylindrical bar 52, and a threaded member 54 rotatably coupled to the bracket 50 and the bar 52 which together form a repositioning means. The bracket 50 includes a lever-arm engaging portion 56 and a threaded-member engaging portion 58. As illustrated in the figures, the lever-arm engaging portion 56 is positioned adjacent the inside surface 60 of the first lever arm 28, and is attached thereto by a rivet 62 or other suitable fastening means. The threaded-member engaging portion 58 includes a threaded-member receiving aperture 62 and extends at an angle 64 from the lever-arm engaging portion 56.

The cylindrical bar 52 includes a longitudinal axis disposed in parallel spaced-apart relation to the pivot pin 22 and a threaded transverse bore 68 having threads 70. The bar 52 extends between the brackets 32 and 34 and is positioned between the first extension 40 of the spring 14, which is shorter than extension 42, and the inside surface 60 of the first lever arm 28.

The threaded member 54 includes a head 72 and a threaded shaft 74 having threads 76 configured to engage the threads 70 of the transverse bore 68. The head 72 is sized to prohibit the head 72 from passing through the aperture 62, while the shaft 74 is sized to allow the shaft 74 to pass through the threaded-member receiving aperture 62.

The angle 64 is predetermined so as to dispose the threaded member 54 perpendicular to the threaded-member engaging portion 58 and parallel to the lever arm 28. As illustrated in the figures, the threaded shaft 74 passes through the aperture 62 and extends generally toward the jaws and parallel to the lever arm 28. The threaded shaft 74 engages the threads 70 of the transverse bore 68 of the bar 52 to couple the bar 52 to the bracket 50.

Figure 2:
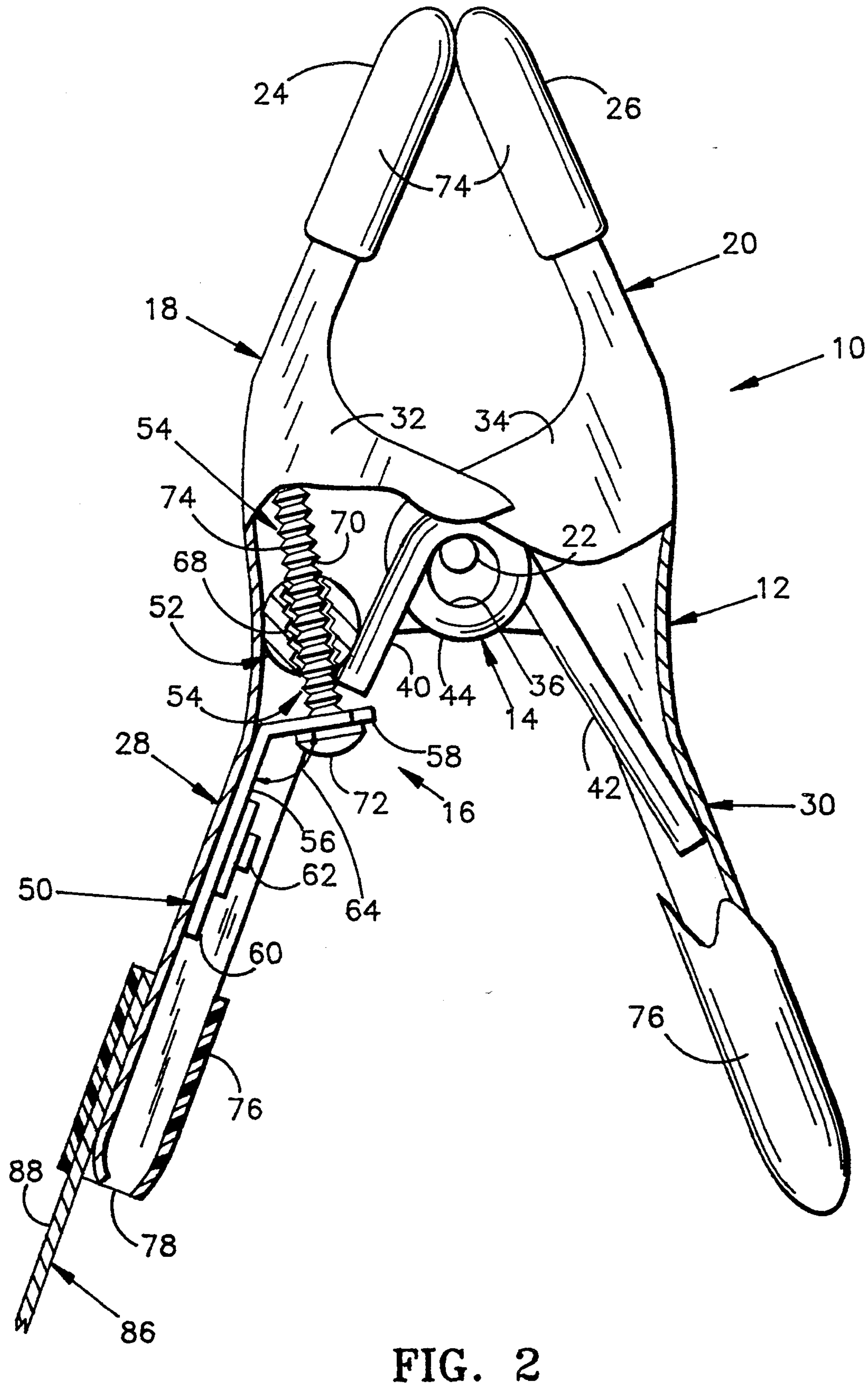
FIG. 2 is a side view of the spring clamp of FIGS. 1–2 illustrating the biasing mechanism in an increased bias position.

In operation, the threaded shaft 74 engages the threads 70 of the transverse bore 68 so that the bar 52 is pulled toward the bracket 50 in response to clockwise rotation of the threaded member 54. As the threaded member 54 is rotated, the bar 52 is pulled under the first end extension 40, pushing the first end extension 40 away from the inside surface 60 of the lever arm 28, as illustrated in FIG. 2. Thus, the first end extension 40 is repositioned toward the second end extension 42, effectively winding the coil spring 14 and thereby increasing the force that the spring 14 applies to the lever arms 28 and 30.

Figure 3:
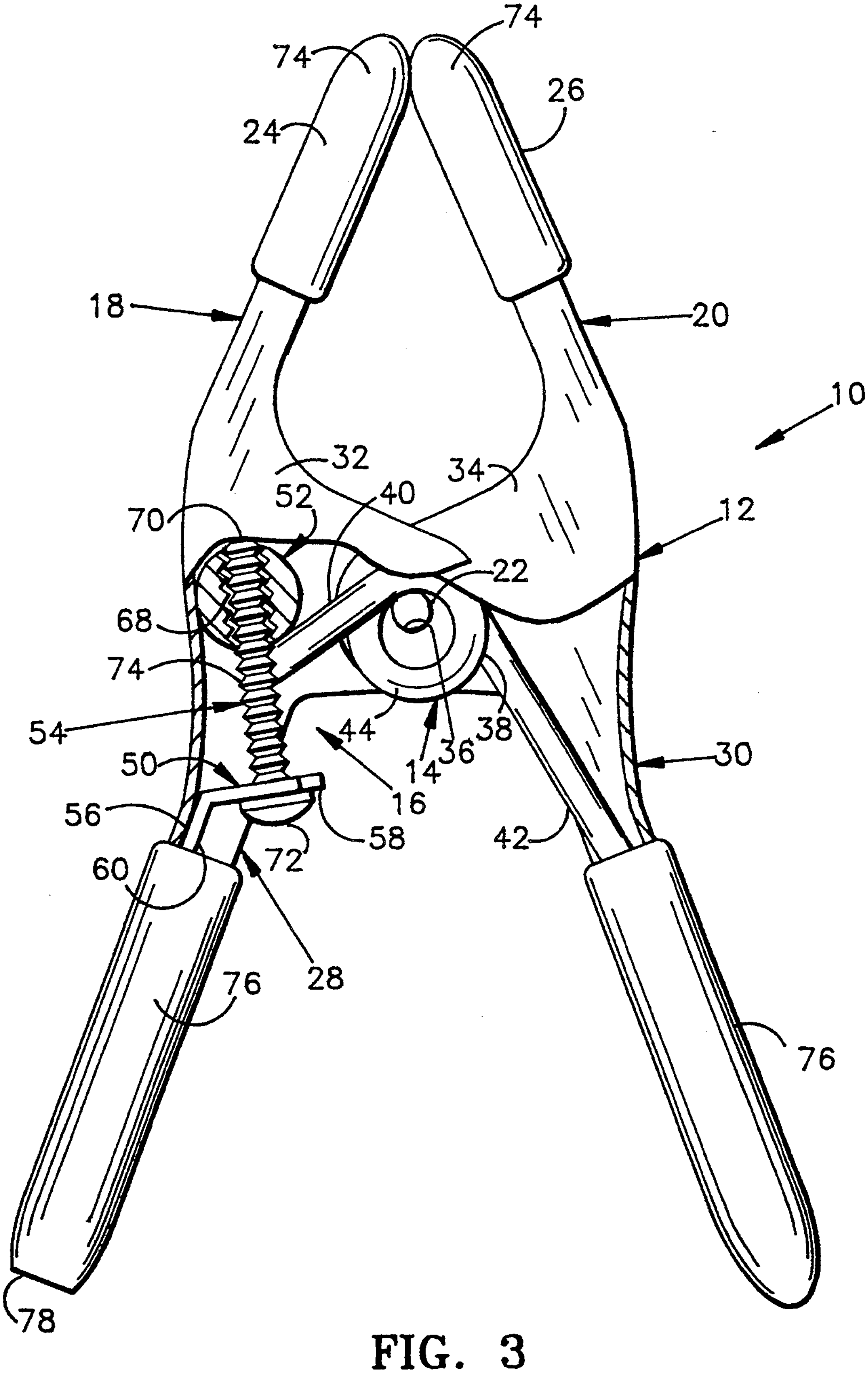
FIG. 3 is a side view of the spring clamp of FIG. 1 illustrating the adjustment mechanism in a reduced bias position.

When the threaded member 54 is rotated in the counterclockwise direction, the tension of the spring 14 acts against the bar 52 to urge the bar 52 to move away from the bracket 50. As the bar 52 moves away from the bracket 50, as illustrated in FIG. 3, the first end extension 40 is repositioned away from the second end extension 42. As the first and second end extensions 40 and 42 move apart, the tension in the spring 14 is decreased, and less force is applied to the lever arms 28 and 30. Thus, the cooperation of the bracket 50, the bar 52, and the threaded member 54 provide a simple, yet effective, means to adjust the bias applied by the spring 14.

Figure 4:
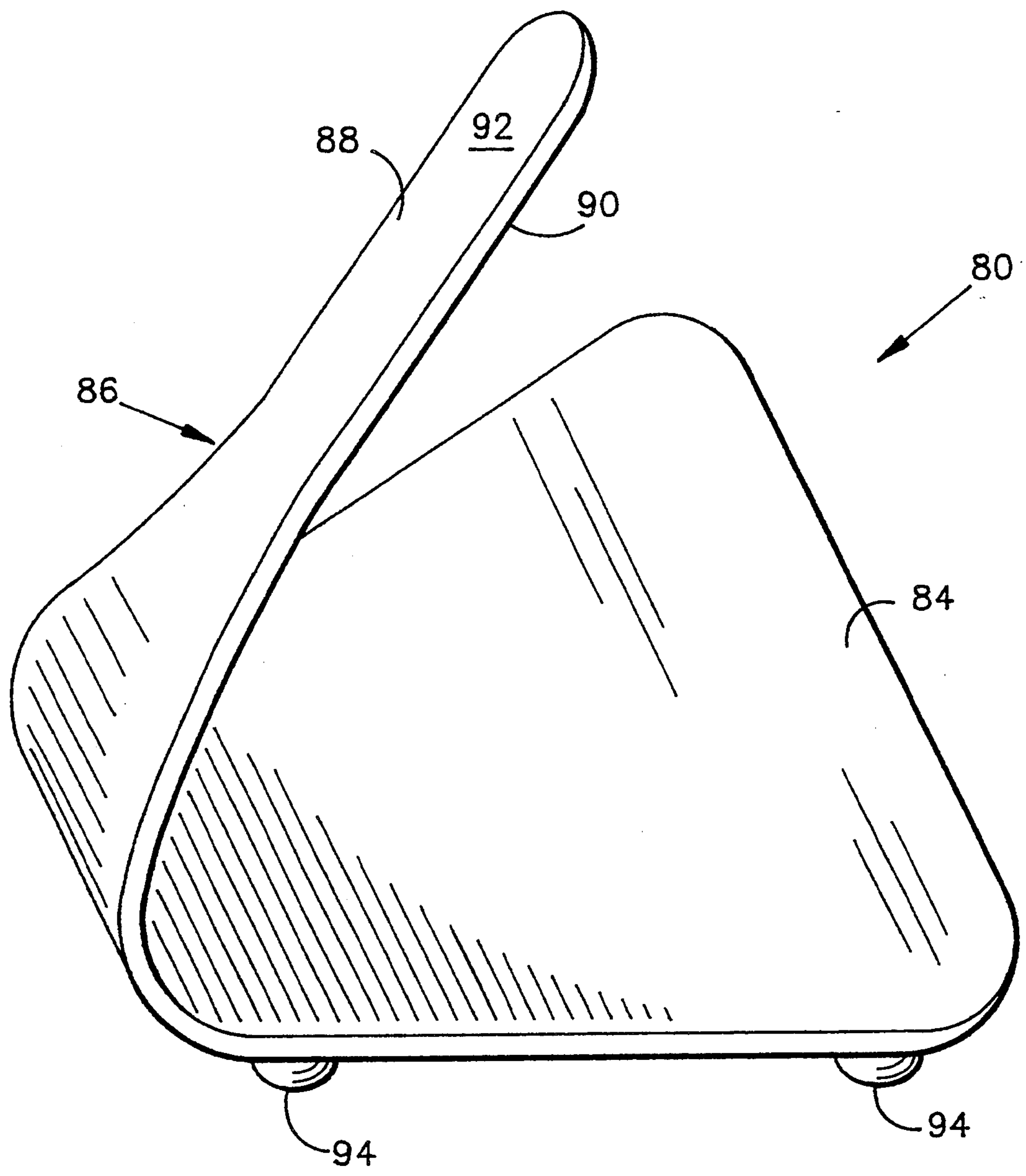
FIG. 4 is a perspective view of a stand for use with the adjustable clamp.
Figure 5:
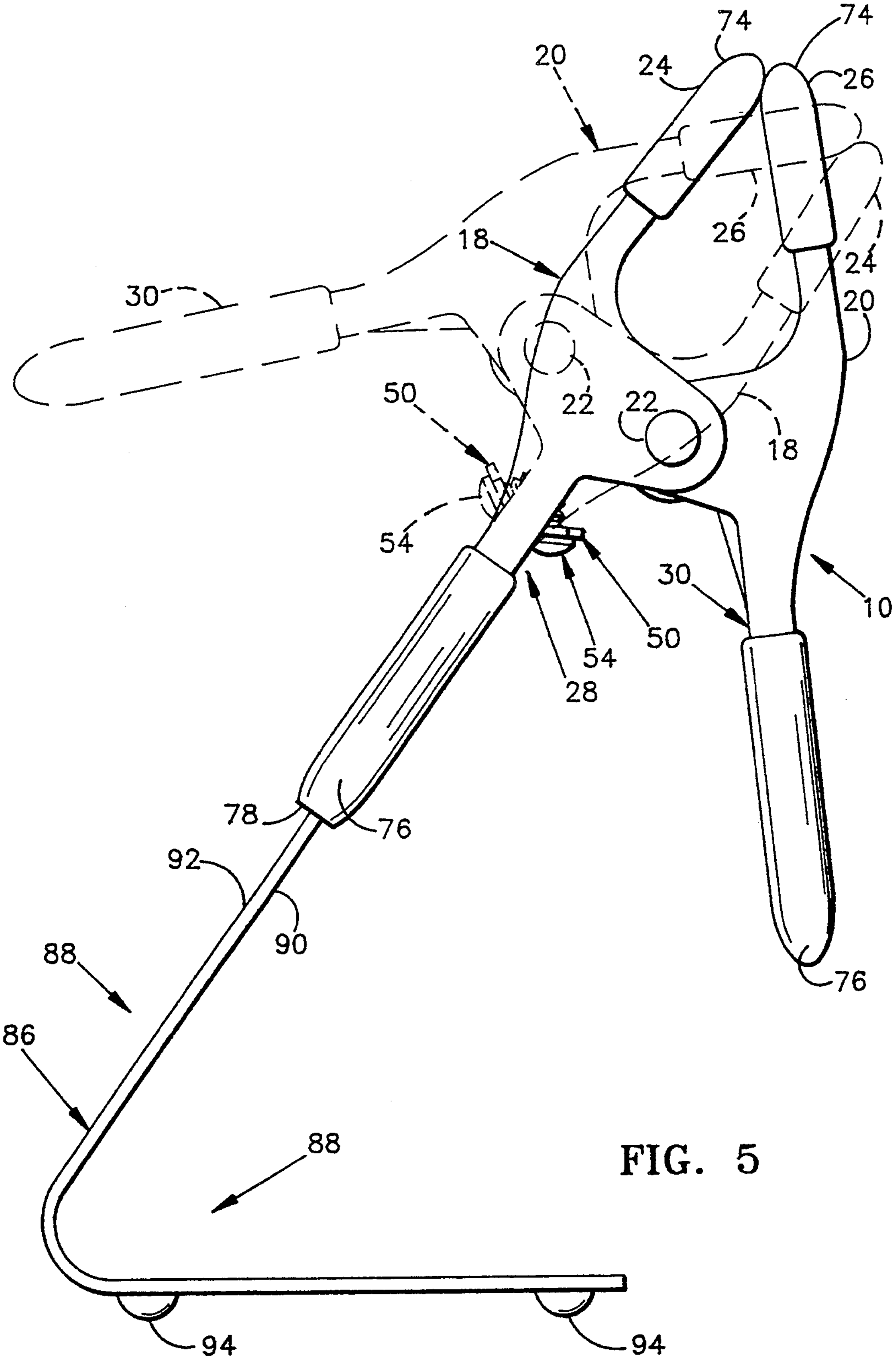
FIG. 5 is a side view of the spring clamp of FIGS. 1–3 coupled to a support stand, the spring clamp being positionable in two orientations.

A support stand 80, such as illustrated in FIG. 4, can be used to support the adjustable clamp 10. As illustrated in FIG. 5, the clamp 10 can be maintained in one of two positions by the stand 80 so as to orient the workpiece and free the hands of the user. The stand 80 includes a base member 84 and a support member 86 which is integrally formed with the base member 84 and bent to project upwardly therefrom. The support arm 86 includes a generally rectangular portion 88 for engaging the clamp 10. The rectangular portion 88 includes first and second surfaces 90 and 92 and has substantially the same width as the lever handles 28 and 30. A plurality of non-skid pads 94 are attached to the bottom of the base member 84 to prevent the support stand 80 from sliding on a work surface.

Elastomeric covers 74 and 76 are coupled to the ends of the lever arms 28 and 30 and to the jaws 24 and 26, respectively. The elastomeric covers 74 and 76 are provided to furnish a comfortable grip while electrically insulating the lever arms 28 and 30 and to prevent the jaws 24 and 26 from marring any article held therein. One of the covers 74 on the lever arms 28 and 30 can include an aperture 78 (FIG. 2) formed in the end of the cover 74.

As illustrated in FIGS. 2 and 5, the rectangular portion 88 of the support arm 86 can be inserted into the aperture 78 and sandwiched between the lever arm 28 and the elastomeric cover 74, with the first surface 90 positioned against the lever arm 28. The cover 74 and lever arm 28 cooperate to grip the rectangular portion 88, so that the clamp 10 is maintained in position relative to the base stand 80. The rectangular portion 88 can also be inserted into the aperture 78 with the second surface 92 positioned against the rectangular portion 88, as seen in phantom in FIG. 5. This allows the user to alter the orientation of the clamp 10 and any workpiece held by the jaws 24 and 26. Thus, the base stand 80, the lever arms 28, and the elastomeric cover 74 cooperate to maintain the clamp 10 in a desired orientation, which can be easily changed by removing the clamp 10 from the base stand 80, rotating the clamp 10 about lever arm 28, and reinserting the support arm 86 into the aperture 78.

Although the invention has been described in detail with reference to a certain preferred embodiment, variations and modifications exist within the scope and spirit of the invention as described and defined in the following claims.

I claim:

1. An adjustable clamp comprising:

first and second gripping members coupled together for pivotal movement about a pivot pin between a gripping position and a releasing position, the first gripping member including a first jaw and a first lever arm, the first jaw and the first lever arm being positioned on either side of the pivot pin;

force applying means, coupled to the pivot pin and the gripping members, for applying a closing force to the members, the force applying means including a spring wrapped around the pivot pin and having a first end extension positioned to engage the first lever arm; and repositioning means for repositioning the applying means to change the closing force.

2. The clamp of claim 1, wherein the repositioning means includes means, positioned between the first end extension of the spring and the first lever arm, for reorienting the first end extension relative to the second end extension and means, coupled to the reorienting means, for moving the reorienting means relative to the first lever arm.

3. The clamp of claim 2, wherein the reorienting means includes a bar having a threaded aperture and the moving means includes a bracket attached to the first lever arm and threaded means rotatably coupled to the bracket for engaging the threaded aperture, the bar moving relative to the first lever arm in response to rotation of the threaded means.

4. The clamp of claim 1, wherein at least one of the first and second gripping members further comprises coupling means for coupling the clamp to a support stand for holding the clamp in a predetermined orientation.

5. The clamp of claim 4, wherein the coupling means comprises an elastomeric member covering the end of the lever arms remote from the jaws, the support stand comprising an end portion adapted to be received between one of the lever arms and the elastomeric member covering said lever arm.

6. The clamp of claim 5, wherein the support stand further comprises a generally trapezoidal base member having a first edge; and a support member coupled to the base member at the first edge and extending upwardly from the first edge to engage the clamp, the support member including a generally trapezoidal lower portion and a generally rectangular upper portion extending upwardly from the lower portion, the upper portion including said end portion engaging said coupling means.

7. The clamp of claim 6, wherein the base member and the support member are unitary and the support member extends from the base member and is bent upwardly from the base member.

8. The clamp of claim 7, further including non-skid means for reducing movement of the base member relative to a work surface.

9. An adjustable clamp comprising:

first and second gripping members pivotally coupled to each other for movement about a pivot pin between a gripping position and a releasing position;

a helically coiled spring having a tubular portion disposed around the pivot pin and having first and second end extensions extending from the tubular portion, the first end extension engaging the first gripping member and the second end extension engaging the second gripping member for biasing the gripping members toward the gripping position; and means for adjusting the amount of bias applied by the biasing means.

10. The clamp of claim 9, wherein the adjusting means includes a bar having a threaded aperture, a threaded member, and a bracket, the bar being positioned between the helically coiled spring first end extension and the first gripping member, the bracket being coupled to the first gripping member and the threaded member rotatably engaging the bracket and the bar, the bar being movable relative to the bracket in response to rotation of the threaded member so as to reposition the first and second end extensions relative to each other.

11. The clamp of claim 9, wherein the adjusting means includes means for moving the first and second end extensions relative to each other to change the bias of the spring.

12. The clamp of claim 11, wherein the adjusting means includes a bar having a threaded bore disposed in parallel spaced-apart relation to the pivot pin, a bracket coupled to the first gripping member, and a threaded member rotatably coupled to the bracket and threadedly coupled to the bar, the bar moving relative to the first gripping member in response to rotation of the threaded member.

13. The clamp of claim 12, wherein at least one of the first and second gripping members further comprises coupling means for coupling the clamp to a support stand for holding the clamp in a predetermined orientation, the coupling means comprising an elastomeric member covering the end of the lever arms remote from the jaws, the support stand comprising an end portion adapted to be received between one of the lever arms and the elastomeric member covering said lever arm.

14. In a clamp having first and second gripping members coupled to a pivot pin for pivotal movement between a gripping position and a releasing position and a spring coupled to the pivot pin including a first and second end extension for applying a force to the gripping members to urge the gripping members to pivot about the pivot pin toward the gripping position, the improvement comprising:

adjusting means for adjusting the position of the spring to affect the amount of the urging force applied to the gripping members including means for repositioning the first and second end extensions relative to each other and moving means for moving the repositioning means.

15. The improvement of claim 14, wherein the repositioning means includes a cylindrical bar having a threaded bore, the bar being positioned between the first end extension and the first gripping member.

16. The improvement of claim 15, wherein the bar is disposed in parallel spaced-apart relation to the pivot pin and the moving means includes a bracket coupled to the first gripping member and a threaded member rotatably coupled to the bracket and threadedly coupled to the bar, the bar moving relative to the first gripping member in response to rotation of the threaded member, the first end extension moving relative to the second end extension in response to movement of the bar.

17. The clamp of claim 16, wherein at least one of the first and second gripping members further comprises coupling means for coupling the clamp to a support stand for holding the clamp in a predetermined orientation, the coupling means comprising an elastomeric member covering the end of the lever arms remote from the jaws, the support stand comprising an end portion adapted to be received between one of the lever arms and the elastomeric member covering said lever arm, a support member extending downwardly from said end portion to a generally trapezoidal base member unitary with the support member further including non-skid means for reducing movement of the base member relative to a work surface.

* * * * *